United States Patent
Bitzer et al.

(10) Patent No.: US 9,551,410 B2
(45) Date of Patent: Jan. 24, 2017

(54) METHOD FOR DAMPING VEHICLE DRIVE TRAIN VIBRATIONS

(71) Applicant: ZF Friedrichshafen AG, Friedrichshafen (DE)

(72) Inventors: Franz Bitzer, Friedrichshafen (DE); Peter Herter, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 269 days.

(21) Appl. No.: 14/484,562

(22) Filed: Sep. 12, 2014

(65) Prior Publication Data

US 2015/0094920 A1 Apr. 2, 2015

(30) Foreign Application Priority Data

Oct. 2, 2013 (DE) .................. 10 2013 219 976

(51) Int. Cl.
 *F16H 57/00* (2012.01)

(52) U.S. Cl.
 CPC ... *F16H 57/0006* (2013.01); *F16H 2057/0012* (2013.01)

(58) Field of Classification Search
 None
 See application file for complete search history.

(56) References Cited

U.S. PATENT DOCUMENTS

| | | |
|---|---|---|
| 6,720,746 B2 | 4/2004 | Amann et al. |
| 6,859,693 B2 | 2/2005 | Tamagawa et al. |
| 7,396,314 B2 | 7/2008 | Winkel et al. |
| 2009/0149999 A1* | 6/2009 | Schramm ............ F16H 57/0006 700/280 |
| 2010/0185373 A1* | 7/2010 | Herter .................. B60W 30/20 701/67 |

FOREIGN PATENT DOCUMENTS

| | | |
|---|---|---|
| DE | 40 09 791 A1 | 10/1991 |
| DE | 101 45 891 A1 | 6/2003 |
| DE | 103 13 338 A1 | 10/2003 |
| DE | 102 44 026 A1 | 4/2004 |
| DE | 10 2011 115 927 A1 | 4/2013 |

OTHER PUBLICATIONS

German Search Report Corresponding to 10 2013 219 976.7 mailed Jul. 21, 2014.

* cited by examiner

*Primary Examiner* — Edwin A Young
(74) *Attorney, Agent, or Firm* — Davis & Bujold, PLLC; Michael J. Bujold

(57) ABSTRACT

A method for assuring that a signal, for damping drive train vibrations, is overlaid during the same time period as the drive train vibration, and not delayed by one time period. The method comprises the steps of continuously calculating a correction torque for the vibration damping, determining, through a parallel signal path, whether the vibration damping is to be activated or deactivated, and overlaying the correction torque to the drive train vibration, if the necessity arises for activation of the vibration damping.

5 Claims, 1 Drawing Sheet

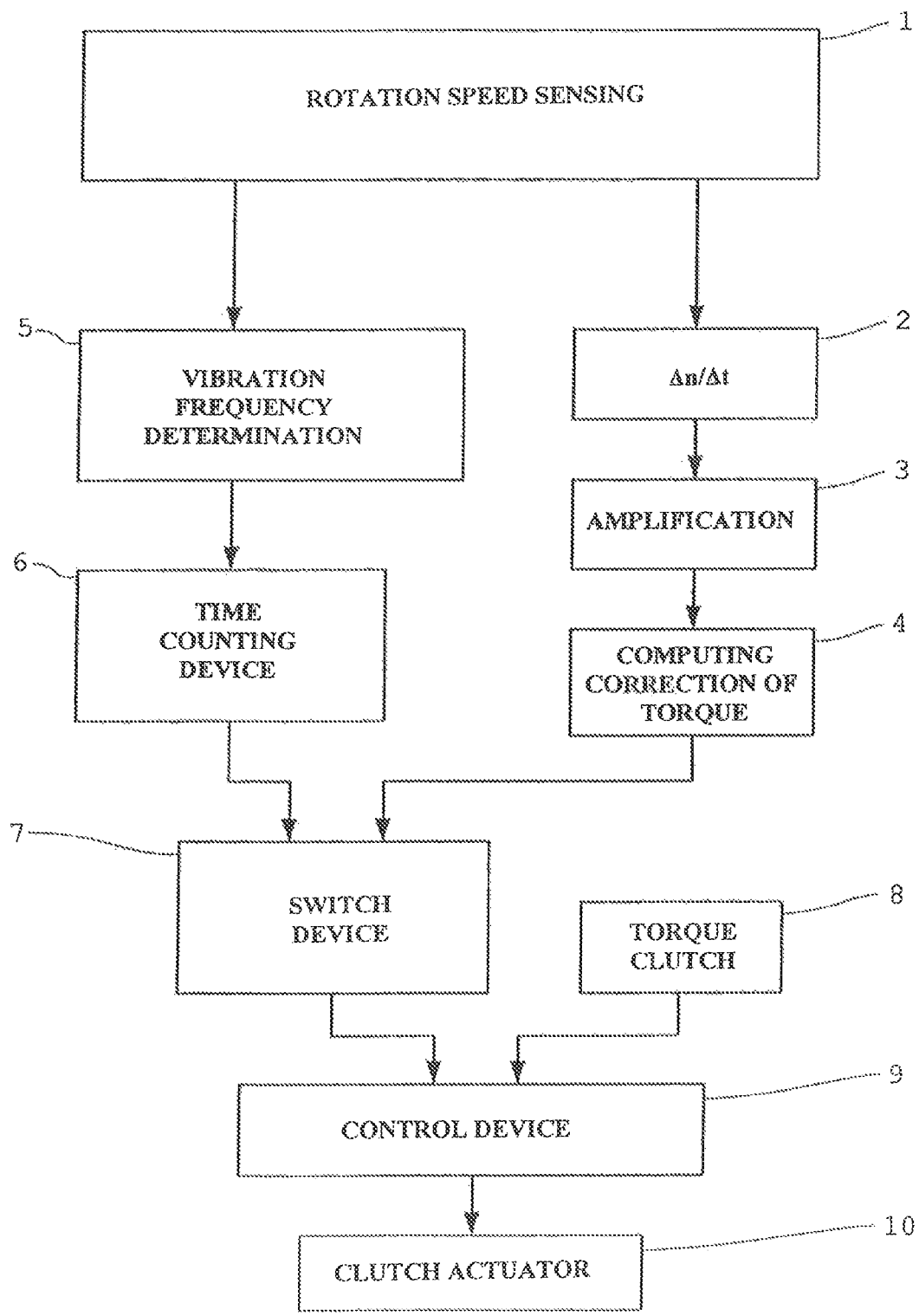

METHOD FOR DAMPING VEHICLE DRIVE TRAIN VIBRATIONS

This application claims priority from German patent application serial no. 10 2013 219 976.7 filed Oct. 2, 2013.

FIELD OF THE INVENTION

The invention concerns a method for damping of drive train vibrations in motor vehicles.

BACKGROUND OF THE INVENTION

Motor vehicles with rotating drive shafts create in different situations unwanted drivetrain vibrations. The cause is often, during the start of a motor vehicle, the start clutch between the combustion engine and the transmission of the vehicle, due to the friction characteristics or due to geometric inconsistencies of its friction lining. Also, uncomfortable vibrations can occur in electrically driven vehicles through the operation of the electric machine. Thus, drive train vibrations can be brought into the drive train through the drive wheels, for instance when driving through a pothole or a manhole cover. Drive train vibrations, depending on the amplitude and frequency, are felt by the passengers in the vehicle as being unpleasant.

The drive train vibrations can be influenced by suitable adjustment means, for instance at the starting clutch, at the combustion engine, or at the electric machine, so that they are largely dampened or in the ideal case completely suppressed.

A method for the suppression of vibrations in the drive train is described in DE 40 09 791 A1 for a motor vehicle which is driven by a combustion engine whereby, when vibrations in the drive train occur, the combustion engine receives a manipulated variable which alters the drive torque of the combustion engine. To recognize such vibrations and to dampen them fast and effectively, it is proposed to determine, through rotational speed information, the rotational speed gradients and using them to determine the vibration and that, by means of a proper phase shift of the first ignition time points in an ignition time point control device, the stored ignition diagram is modified in the respective ignition time points of a second ignition time point control device, and the drive torque of the combustion engine is modified in a way that the vibration and the drive train of the combustion engine are dampened.

DE 10 2011 115 927 A1 teaches a method for the recognition of rotational speed/torque variations, in particular of samples of such deviation of a drive device in a motor vehicle, the method having the following steps: recognition of a critical rotational speed situation, in particular by means comparisng a measured actual rotational speed with predetermined given rotational speed, retrieval of a local rotational speed minimum and a local rotational speed maximum (local rotational speed parameters), evaluation of these local rotational speed parameters, in particular the creation of local rotational speed parameter values, like preferably of a local amplitude and a local frequency, a direct or indirect determination of the duration of a local vibration time interval, whereby in particular within this time interval constant local rotational speed parameters are present, and the description of a local vibration sample which possesses at least the local amplitude, the local frequency, or the local vibration interval.

Another method for the reduction of vibrations in a motor vehicle is described in DE 102 44 026 A1. In this method, interfering vibrations are recognized by a control and regulation device by means of proper send source and, during exceeding prior determined limiting values, at least one device is actuated in a way that the interfering vibration is completely eliminated or at least dampened in its amplitude. Wherein, the at least the one device acts on an at least one rotating part in the vehicle drive train in such a manner that the latter, when a vibration occurs, is continuously or periodically slowed down in its rotational motion or is actuated to compensate for vibration. Hereby, the compensation vibration or the brake action has the same or a similar frequency as the interfering vibration but it has, however, a vibration phase shift with it which creates a reduction of the amplitude of the interfering vibration.

A weak point in these publications and the taught method arises because recognition of these vibrations requires additional sensors, for instance torque sensors, and/or the typical sensor information which is present, is analyzed unfavorably. Often, computation intensive algorithms are applied to analyze the amplitude and phase position of the drive train vibration. If, like it is in many occasions, a rotational speed signal or a differential rotational speed signal that is used as the basis for the vibration damping, the disadvantage is that hereby a phase delay is created which demands larger requirements in regard to the so-called cut-off frequencies, and which are difficult to meet. In practice, it is often the case that the signal for the damping of the vibration is not simultaneous with the interfering vibration, but is issued after a delay of one period.

SUMMARY OF THE INVENTION

Based on this background, the objective of the invention is to propose a method for the damping of drive train vibrations in motor vehicles by which it is possible to effectuate a signal to dampen the drive train vibrations during the same vibration period, which is applied to the drive train vibration.

The objective is achieved by a method with the characteristics as described below.

Thus, the invention relates to a method for damping drive train vibrations in motor vehicles with the steps:

Continuously calculating a corrective torque for damping vibration;
Determining through a parallel signal path whether the vibration damping shall be activated or deactivated;
Overlaying the corrective torque with the drive train vibrations if there is a necessity for activating the vibration damping.

Hereby, the activation or, respectively, deactivation of vibration damping takes place preferably through an overlay or the deactivation, respectively, of the correction torque at the drive train vibrations by means of a steady transition function so that, through the hereby achievable soft transition, an additional vibration initiation can be omitted, The activation or the deactivation, respectively, of the vibration damping takes place without an additional phase shift through calculation of the correction torque.

In other words, due to the continuous calculation of correction torque, no additional phase shift occurs in regard to the parallel signal path in its calculation, whether the vibration damping shall be activated or deactivated.

In particular, the method is comprised of:
Sensing a rotational speed signal at the drive train;
Differentiating the rotational speed signal;

Amplifying the derived rotational speed signal with an amplification factor dependent on the drive train, then continuously calculating the correction torque;

In parallel with this, determining the frequency of the drive train vibrations through the measured rotational speed signals;

Detecting the maxima and minima drive train vibrations in regard to predetermined threshold values from the rotational speed signal;

During the first calculation or capturing, respectively, of a maximum or minimum, starting a timer for counting from a start value in the direction of a zero value;

During the next calculation or capturing, respectively, of a maximum or minimum of the drive train vibrations, a reset of the time, but the time counter device to the value zero;

During the next calculation or, respectively, capturing of a maximum or minimum of the drive train vibrations, resetting the time counter device to the start value;

Activation of the vibration damping when the start of the device, due to at least a new maximum or minimum, was reset and the timer has reached the value zero;

Deactivation of the vibration and in a damping if the time counter device, due to at least a new maximum or minimum, has been reset without the timer having reached a zero value.

The amplification factor can depend on the rotational speed difference between the input element and the output element of a start clutch of a vehicle, which can be positioned between a drive motor and transmission.

BRIEF DESCRIPTION OF THE DRAWING

The invention is further explained in the following based on an embodiment example shown in the drawing.

DETAILED DESCRIPTION OF THE PREFERRED EMBODIMENTS

It in accordance with the function block 1, a rotational speed signal is sensed and used as an input signal. The rotation signal is, for instance, the transmission input rotational speed of a motor vehicle. The rotational speed signal, in accordance with the function block 2 is differentiated based on time and could optionally undergo filtering. The output signal of the function block 2, in accordance with function block 3, is multiplied by an amplification factor which depends on additional, conditional parameters of the vehicle, such as the rotational speed difference between the input element and the output element of a starter clutch of the vehicle. This results in the continuously calculated correction torque in the function block 4.

Due to a limited cut-off frequency of the system, such as the signal runtime and a CAN data bus system, the time period for the calculations, the reaction time of the actuator for the overlay of a correction torque to the drive train, the desired vibration damping can only have a positive effect within a certain frequency range, otherwise a damaging engagement of the clutch would occur, whereby the correction torque which is added to the output torque, amplifies the present drive train vibration.

Therefore, an additional calculation is needed to determine the vibration frequency of drivetrain vibrations and the correction torque needs to be, either added or omitted through a switch control program technique, to the drive train vibration. In accordance with the invention, the rotational speed signal or the rotational speed information, respectively, is therefore brought forwarded through a parallel path, in accordance with the function block 1, to a time based and parallel determination of the frequency. The occurring maxima and minima of the drive train vibrations are here determined. During the first occurrence of a maximum or minimum of the drive train vibrations, a time counting device 6 is started, which counts down from the start value in the direction of the value zero. However, the time counting device 6 is only started when the recognized maxima and minima are above a determined, absolute threshold value. During the next occurrence of a maximum or minimum, the time counting device 6 is reset to the determined start value. The time counting device 6, in its function as a program technology switch, starts the vibration damping with a calculated correction torque only when the time counting device 6 has been reset to its start value due to a new maximum or minimum, and the counter reading has reached the value zero prior to it. The time counting device 6, in its function as a program technology switch, terminates the vibration damping with the calculated correction torque only at the time when the time counting device 6 has been reset to its start value due to a new maximum or minimum, without the counter reading having reached the value zero prior to it.

The calculated correction torque in accordance with the function block 4 and the signal of the time counting device 6 for the activation or deactivation, respectively, of the vibration damping are forwarded to a switch device 7 which has been created to continuously provide the calculated correction torque by means of a steady transition function and, through a release by the time counting device 6, and to forward it as a signal to the control device 9 which supplies an actuator 10 of the starting clutch of the vehicle with activating signals.

The overlay of the correction torque with the torque which has the drive train vibrations takes place by means of the actuator 10 which activates the starting clutch, and which is continuously actuated in such a way that the starting clutch transmits the desired torque and at the same time the correction torque from the vehicle drive motor to the vehicle transmission.

The active and continuous direction torque of the switch device 7 also reaches therefore the signal for the desired drive torque at the output element of the starting clutch and in accordance with function block 8, to the control device 9, wherein by combining these parameters a value for a corrected clutch torque is continuously calculated which can be used as a control for the creation of at least a lower vibration torque pattern.

All characteristics in the prior description of the drawing, in the claims and in the description in production can be applied as either as single, or in any combination with each other, Therefore, the invention is not limited to the described and claimed characteristics combinations, and it should be viewed as all the characteristics combinations are taught.

REFERENCE CHARACTER LIST

1 Function Block Rotational speed Sensing
2 Function Block Rotational speed Differentiation
3 Function Block Amplification of the differentiated Rotational speed Signal
4 Function Block Calculation of the Correction Torque
5 Function Block Determination of the Vibration Frequency, maxima and minima of the Vibration
6 Function Block Time Counting Device
7 Function Block Switch Device 8 Function Block Input of the Clutch Torque
9 Function Block Merging of the Correction Torque with the Clutch Torque
10 Clutch Actuator

The invention claimed is:

1. A method of damping drive train vibrations in a motor vehicle, the method comprising the steps of:
    continuously calculating a correction torque for the vibration damping;
    determining, through a parallel signal path, whether the vibration damping shall be either activated or deactivated;
    activation the vibration damping by overlaying the correction torque with the drive train vibration;
    sensing a rotational speed signal in the drive train;
    differentiating the rotational speed signal;
    amplifying a derivation of the rotational speed signal with an amplification factor dependent on the drive train, and then continuously calculating the correction torque;
    parallel hereto, determinating a frequency of the drive train vibrations from measured rotational speed signals;
    detecting maxima and minima of the drive train vibrations with regard to established threshold values from the rotational speed signals;
    starting a time counting device to count from a start value in a direction toward a zero value through a first determination of either a maximum or a minimum;
    resetting the time counting device to the start value, during a next determination of either a maximum or a minimum of the drive train vibrations;
    activating the vibration damping of the time counting device has been reset due to at least a new maximum or a new minimum, and the time counting device has reached the zero value; and
    deactivating the vibration damping if the time counting device has been reset due to at least a new maximum or a new minimum but the time counting device has not reached the zero value.

2. The method according to claim 1, further comprising the step of:
    either activating or deactivating the vibration damping by either overlaying or deactivating the correction torque via a steady transition function.

3. The method according to claim 1, further comprising the step of:
    either activating or deactivating the vibration damping without an additional phase shift through the calculation of the correction torque.

4. The method according to claim 1, further comprising the step of:
    defining the amplification factor as being dependant on the differential rotational speed between an input element and an output element of a starting clutch which is positioned between a drive motor and a transmission.

5. A method of damping drive train vibrations in a motor vehicle, the method comprising the steps of:
    sensing a rotational speed signal in the drive train;
    differentiating, in a first signal path, the rotational speed signal;
    amplifying, in the first signal path, a derivation of the rotational speed signal with an amplification factor that is dependant on a conditional parameter of the drive train;
    continuously calculating, in the first signal path, a vibration damping correction torque;
    determining, in a second signal path, a frequency of the drive train vibrations from the sensed rotational speed signals, and the second signal path being parallel to the first signal path;
    detecting, in the second signal path, maxima and minima of the sensed drive train vibrations with regard to an established threshold value;
    starting, in the second signal path, a time counting device to count from a start value in a direction toward a zero value during a first determination of either a maximum or a minimum of the sensed drive train vibrations;
    resetting, in the second signal path, the time counting device to the start value, during a next determination of either a maximum or a minimum of the sensed drive train vibrations;
    determining, in the second signal path, to either simultaneously activate or deactivate vibration damping with the continuous calculation of the vibration damping correction torque;
    activating, in the second signal path, the vibration damping if the time counting device has been reset due to at least a new maximum or a new minimum of the sensed drive train vibrations, and the time counting device has reached the zero value;
    deactivating, in the second signal path, the vibration damping if the time counting device has been reset due to at least a new maximum or a new minimum of the sensed drive train vibrations, and the time counting device has not reached the zero value; and
    activating the vibration damping by overlaying the correction torque with the drive train vibrations.

* * * * *